(12) United States Patent
Stachowiak et al.

(10) Patent No.: US 9,481,798 B1
(45) Date of Patent: Nov. 1, 2016

(54) NANOSTRUCTURED COMPOSITIONS CONTAINING NANOPARTICLES AND CARBON NANOTUBES AND METHODS FOR PRODUCTION THEREOF

(71) Applicant: Lockheed Martin Corporation, Bethesda, MD (US)

(72) Inventors: Timothy B. Stachowiak, Austin, TX (US); Georgina Baca, Palo Alto, CA (US); Ashley E. Pietz, Union City, CA (US); Hilary S. Lackritz, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 111 days.

(21) Appl. No.: 14/461,309

(22) Filed: Aug. 15, 2014

Related U.S. Application Data

(62) Division of application No. 13/415,789, filed on Mar. 8, 2012, now Pat. No. 8,834,746.

(60) Provisional application No. 61/451,091, filed on Mar. 9, 2011.

(51) Int. Cl.
  *H01B 1/04* (2006.01)
  *C09D 1/00* (2006.01)
  *B82Y 40/00* (2011.01)

(52) U.S. Cl.
  CPC .................. *C09D 1/00* (2013.01); *B82Y 40/00* (2013.01); *Y10S 977/773* (2013.01); *Y10S 977/842* (2013.01); *Y10S 977/882* (2013.01)

(58) Field of Classification Search
  None
  See application file for complete search history.

(56) References Cited

U.S. PATENT DOCUMENTS

| | | | | |
|---|---|---|---|---|
| 2006/0024503 A1* | 2/2006 | Wong | ........................ | B82B 1/00 428/408 |
| 2007/0053824 A1* | 3/2007 | Subramanya | ............. | D01F 9/12 423/447.3 |
| 2007/0215841 A1* | 9/2007 | Ford | ...................... | B82Y 30/00 252/503 |
| 2009/0318717 A1* | 12/2009 | Virtanen | .............. | C07D 303/18 549/512 |
| 2010/0009165 A1* | 1/2010 | Patel | ........................ | C09D 5/24 428/323 |
| 2010/0055416 A1* | 3/2010 | Yang | ........................ | H01B 1/24 428/195.1 |
| 2010/0173376 A1* | 7/2010 | Ostojic | .................. | B82Y 30/00 435/176 |
| 2010/0270069 A1* | 10/2010 | Shar | ........................ | H01B 1/18 174/377 |

OTHER PUBLICATIONS

Georgakilas, et al. "Attachment of Magnetic Nanopartioles on Carbon Nanotubes and Their Soluble Derivatives," Chemistry of Materials, Apr. 5, 2005, pp. 1613-1617, vol. 17.

\* cited by examiner

*Primary Examiner* — Harold Pyon
*Assistant Examiner* — Katie L Hammer
(74) *Attorney, Agent, or Firm* — McDermott Will & Emery LLP

(57) ABSTRACT

Nanostructured compositions containing carbon nanotubes and at least one other type of nanoparticle can display the beneficial properties of both substances. Nanostructured compositions can contain a plurality of carbon nanotubes, a plurality of nanoparticles, and a plurality of linker moieties, where at least a portion of the linker moieties connect at least a portion of the carbon nanotubes to the nanoparticles. The nanostructured compositions can form a substrate coating. The nanostructured compositions can contain two or more different types or sizes of nanoparticles. Methods for forming a nanostructured composition can include forming a non-covalent bond between a linker moiety and a carbon nanotube, forming a covalent bond between a linker moiety and a nanoparticle or a surfactant coating thereon, and applying a plurality of carbon nanotubes to a substrate. The linker moiety can be non-covalently bonded to the carbon nanotube before or after applying the carbon nanotubes to the substrate.

20 Claims, 2 Drawing Sheets

NANOSTRUCTURED COMPOSITIONS CONTAINING NANOPARTICLES AND CARBON NANOTUBES AND METHODS FOR PRODUCTION THEREOF

CROSS-REFERENCE TO RELATED APPLICATIONS

The present application is a divisional of U.S. patent application Ser. No. 13/415,789, filed Mar. 8, 2012, which claims the benefit of priority under 35 U.S.C. §119 from U.S. Provisional Patent Application 61/451,091, filed Mar. 9, 2011, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to carbon nanomaterials, and, more particularly, to compositions containing both carbon nanotubes and organic or inorganic nanoparticles.

BACKGROUND

Increasing demand for enhanced operational performance in a variety of consumer, industrial, and military products has paved the way for development of the next generation of high performance materials. Recent research efforts in this regard have focused on nanomaterials due to their unique properties that are not usually observed in equivalent macroscale materials.

Carbon nanomaterials, particularly carbon nanotubes, have been the subject of especially intense study, the latter due to their exceptionally high mechanical strength and good electrical and thermal conductivity values. Other carbon nanomaterials such as graphene, fullerenes, and diamond-like carbon can display some properties that are similar to carbon nanotubes, but their mechanical strength can be poorer. The combined strength and flexibility of carbon nanomaterials can be of great value for multiple applications.

Nanoparticles other than carbon nanomaterials have also been the focus of intense research interest in recent years. As used herein, the term "nanoparticle" will refer to a material that has a size of about 100 nm or less in a least one dimension. When using the term "nanoparticle" herein, it is to be understood that this term does not refer to a carbon nanomaterial. Nanoparticles can come in a wide range of sizes and types (i.e., compositions), and they can be organic or inorganic in nature. Illustrative types of nanoparticles can include, for example, quantum dots (i.e., semiconductor nanoparticles), metal nanoparticles, metal oxide nanoparticles, non-metal nanoparticles, polymer nanoparticles, and the like. Further, different wavelengths of electromagnetic radiation can be absorbed by the nanoparticles simply by varying their size and/or type.

Although carbon nanomaterials and nanoparticles have beneficial properties that are ripe for utilization, combining these substances into a single composition that effectively takes advantage of both components has been technically challenging. The present invention satisfies the foregoing need and provides related advantages as well.

SUMMARY

In some embodiments, coated surfaces are described herein. The coated surfaces include a substrate and a coating on the substrate. The coating contains a composition that includes a plurality of carbon nanotubes, a plurality of nanoparticles, and a plurality of linker moieties. At least a portion of the linker moieties connect at least a portion of the carbon nanotubes to the nanoparticles.

In some embodiments, methods described herein include providing a plurality of linker moieties, at least a portion of the linker moieties containing a silane functionality and at least one other functional group; providing a plurality of nanoparticles and a plurality of carbon nanotubes; forming a covalent bond between a linker moiety and a nanoparticle by reacting the silane functionality; forming a non-covalent bond between a linker moiety and a carbon nanotube; and applying the plurality of carbon nanotubes to a substrate.

In some embodiments, methods described herein include providing a plurality of carbon nanotubes and a plurality of nanoparticles, the nanoparticles having a surfactant coating thereon; providing a plurality of linker moieties, at least a portion of the linker moieties containing at least two functional groups, a first functional group being reactive with the surfactant coating; forming a covalent bond between a linker moiety and the surfactant coating of a nanoparticle by reacting the first functional group; forming a non-covalent bond between a linker moiety and a carbon nanotube; and applying a plurality of carbon nanotubes to a substrate.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
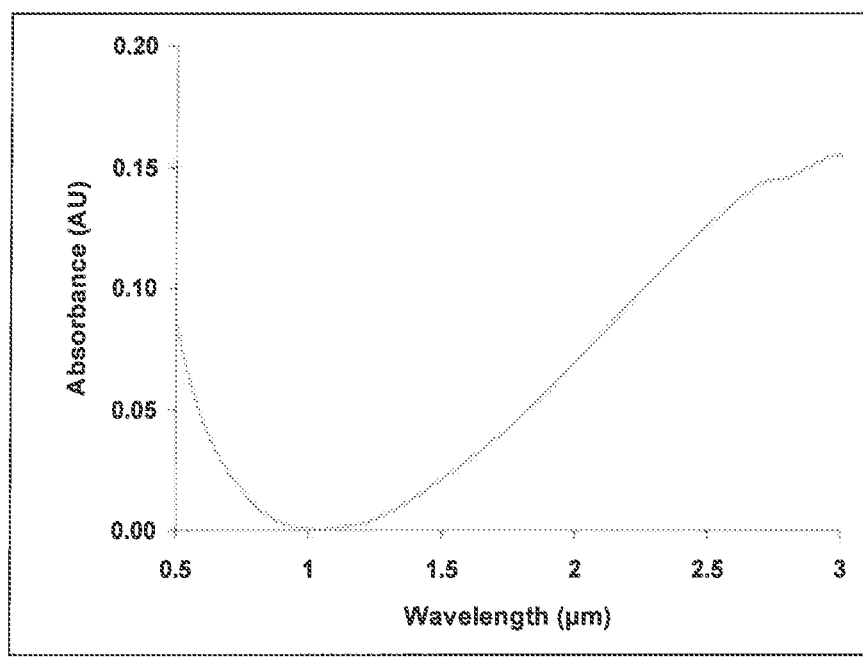
FIG. 1 shows an absorption spectrum of a carbon nanotube coating containing admixed antimony tin oxide nanoparticles spray coated on a glass substrate.

The present disclosure is directed, in part, to compositions containing carbon nanotubes and nanoparticles, where the carbon nanotubes and nanoparticles are connected by a linker moiety. The present disclosure is also directed, in part, to methods for making the foregoing compositions and applying the compositions to a substrate. The present disclosure is also directed, in part, to coated surfaces containing a substrate coating of the foregoing compositions.

Compositions described herein contain both carbon nanotubes and nanoparticles, where the carbon nanotubes and the nanoparticles are connected to one another by a linker moiety. In addition to the benefits that can be realized by combining carbon nanotubes, which have exceptional mechanical strength, with nanoparticles, which can have tunable optical properties, connecting the carbon nanotubes and the nanoparticles to one another can allow additional advantages to be realized compared to simple physical combinations of the two materials. For example, by connecting the carbon nanotubes and the nanoparticles to one another, the nanoparticles can become less likely to separate from the carbon nanotubes, thereby allowing the beneficial properties of both materials to be more uniformly distributed throughout the compositions. In addition, by connecting the nanoparticles to the carbon nanotubes, deposition of the nanoparticles on a substrate surface can be conducted more readily and with enhanced homogeneity. Furthermore, coatings can be applied at a lower cost than by other techniques.

Carbon nanotubes can provide particularly advantageous benefits when they are applied to a substrate surface. In addition to mechanical reinforcement, the carbon nanotubes can convey improved electrical and/or thermal conductivity to the surface. Even more significantly with regard to the present compositions, carbon nanotubes readily adhere to a wide variety of surfaces. Nanoparticles, in contrast, generally adhere to surfaces much more weakly. Thus, carbon nanotubes can provide a structurally robust scaffold upon which nanoparticles can be applied to a substrate surface. As noted above, by connecting carbon nanotubes and nanoparticles to one another, the present compositions may have more uniform properties than do simple admixtures of the two materials, thereby allowing more uniform coatings of carbon nanotubes and nanoparticles to be prepared.

Coatings prepared by separately embedding nanoparticles and carbon nanotubes within a polymer matrix may not realize the same level of uniformity as those of the present embodiments due to difficulties in dispersing the nanoparticles, the carbon nanotubes, or both within the polymer matrix. In addition, polymer coatings may need to be cured, which can add to the time and expense needed to form the coating. Further, the curing process can sometimes detrimentally affect the carbon nanotubes, the nanoparticles, and/or the surface being coated. Polymer coatings also may not adhere to a substrate surface as strongly as a carbon nanotube coating. Embodiments described herein can address the foregoing issues.

Although the present compositions are contemplated to have any type of connection between the carbon nanotubes and the nanoparticles, particular embodiments described herein include very facile attachment chemistries that allow the carbon nanotubes and the nanoparticles to be quickly and simply connected to one another. The nature of the attachment chemistries can be amenable to forming solutions or dispersions of the compositions, thereby allowing the compositions to be readily applied to surfaces by a variety of coating techniques. Although applying the carbon nanotubes to a surface with the nanoparticles already connected thereto can be advantageous to reduce the complexity of the coating process (i.e., by applying the finished compositions to a surface), there is no requirement to do so. That is, in some embodiments, the carbon nanotubes can first be applied to a surface, and the linker moieties and nanoparticles can be connected to the carbon nanotubes thereafter. In still other embodiments, carbon nanotubes having attached linker moieties can first be applied to a surface, and the nanoparticles can be connected thereafter. Stepwise application of the coatings can be advantageous, for example, if a composition containing carbon nanotubes and a particular type of nanoparticle is not readily soluble or dispersible in a fluid phase, but the individual components of the coating are soluble or dispersible. Various chemistries for connecting carbon nanotubes and nanoparticles to one another, and the advantages thereof, are discussed in more detail hereinafter.

Compositions described herein can be used in a wide variety of applications, particularly applications in which it is desired to form a coating that alters the properties of a surface. Compositions described herein are believed to have excellent thermal and environmental stability. Without limitation, it is contemplated that the present compositions can be used in applications such as, for example, thermal management, optical filtering, optical tagging and tracking, and the like. Also without limitation, it is also contemplated that devices such as, for example, solar cells, printed electronics, sensors, and the like can display particular benefits when the present compositions are utilized therein. In addition to applicational flexibility, the present compositions can be used under a variety of operational conditions, including space, ground, and air operational environments.

Figure 2:
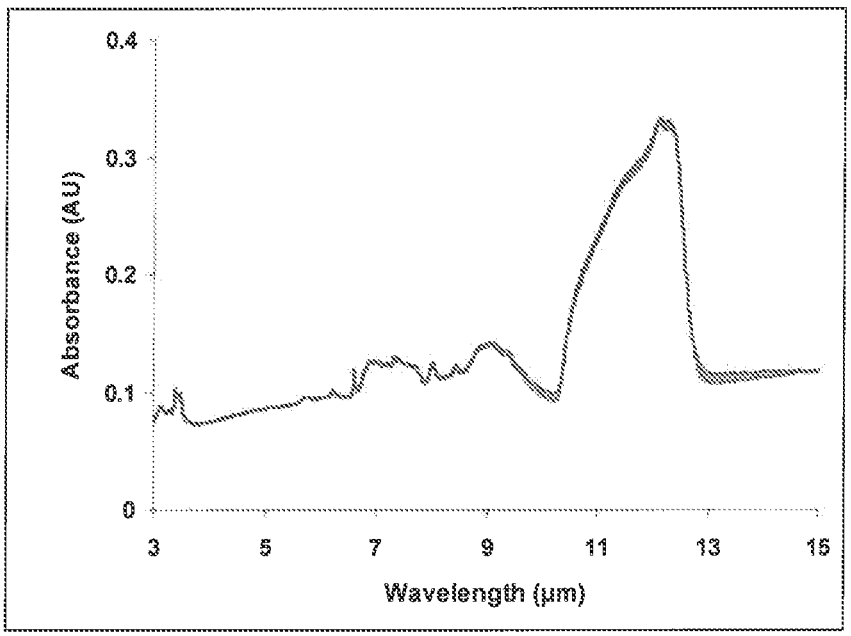
FIG. 2 shows an absorption spectrum of a carbon nanotube coating containing admixed silicon carbide nanoparticles solubilized with a surfactant coating.

The present compositions can be used to alter the optical absorption properties of a surface. FIG. 1 shows an absorption spectrum of a carbon nanotube coating containing admixed antimony tin oxide nanoparticles spray coated on a glass substrate. As shown in FIG. 1, the coating absorbs significantly in the short wavelength infrared region. FIG. 2 shows an absorption spectrum of a carbon nanotube coating containing admixed silicon carbide nanoparticles solubilized with a surfactant coating. As shown in FIG. 2, the coating displays significant absorption between 11 mm and 13 mm in the long wavelength infrared region.

Figure 3:
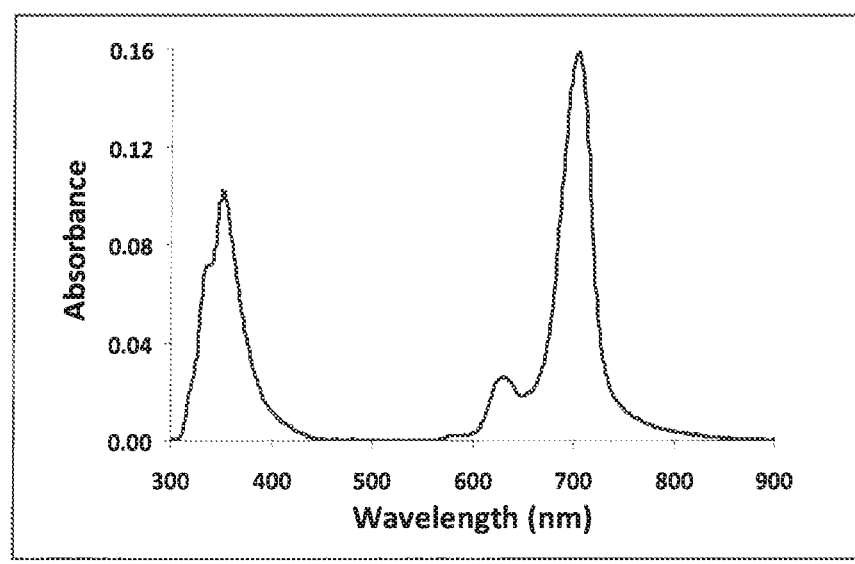
FIG. 3 shows an absorption spectrum of a carbon nanotube coating containing a near-infrared dye non-covalently bonded to the carbon nanotubes.

In alternative embodiments, traditional dyes can be combined with carbon nanotubes to form a coating that absorbs electromagnetic radiation of a desired wavelength. FIG. 3 shows an absorption spectrum of a carbon nanotube coating containing a near-infrared dye non-covalently bonded to the carbon nanotubes.

In general, any type of carbon nanotubes can be used in the embodiments described herein. In various embodiments, the carbon nanotubes can be single-wall carbon nanotubes, double-wall carbon nanotubes, triple-wall carbon nanotubes, multi-wall carbon nanotubes, or any combination thereof. In some embodiments, the carbon nanotubes can be functionalized. For example, in some embodiments, the carbon nanotubes can be functionalized to improve their adherence to a surface. In some or other embodiments, the carbon nanotubes can be functionalized so that they can form a covalent bond with a linker moiety. In other embodiments, the carbon nanotubes can remain unfunctionalized. One of ordinary skill in the art will recognize advantages of choosing a particular type and functionalization of carbon nanotubes for a given application. Further, one of ordinary skill in the art will be familiar with the techniques needed to produce a given type of functionalized carbon nanotubes. In addition to the foregoing, the length and/or diameter of the carbon nanotubes can be varied for particular applications. Choice of an appropriate carbon nanotube length and/or diameter for a particular application can again be readily determined by one having ordinary skill in the art.

Although the description herein focuses on the combination of carbon nanotubes and nanoparticles, it is to be recognized that other carbon nanomaterials can be used in a similar manner. For example, in some embodiments, carbon nanomaterials such as graphene, fullerenes, diamond-like carbon, or carbon black, can be used to form compositions similar to those described herein that contain carbon nanotubes. Although it is expected that the compositions containing carbon nanotubes can have certain operational advantages (e.g., mechanical strength), related compositions containing other carbon nanomaterials can provide different advantages that may be appropriate for some applications.

In some embodiments, compositions described herein can contain a plurality of carbon nanotubes, a plurality of nanoparticles, and a plurality of linker moieties, where at least a portion of the linker moieties connect at least a portion of the carbon nanotubes to the nanoparticles.

In some embodiments, compositions described herein can contain a plurality of carbon nanotubes; a plurality of nanoparticles containing two or more different types or sizes of nanoparticles, where each type or size of nanoparticle interacts with electromagnetic radiation of different wavelengths; and a plurality of linker moieties, where at least a portion of the linker moieties connect at least a portion of the carbon nanotubes to the nanoparticles.

In some embodiments, the linker moieties can be covalently bonded to the carbon nanotubes. In other embodiments, the linker moieties can be non-covalently bonded to the carbon nanotubes. In some embodiments, the linker moieties can be covalently bonded to the nanoparticles. In other embodiments, the linker moieties can be non-covalently bonded to the nanoparticles. In some embodiments, the linker moieties can be non-covalently bonded to the carbon nanotubes and covalently bonded to the nanoparticles. In some embodiments, the linker moieties can be covalently bonded to the carbon nanotubes and non-covalently bonded to the nanoparticles. In other embodiments, the linker moieties can be non-covalently bonded to the carbon nanotubes and non-covalently bonded to the nanoparticles. In still other embodiments, the linker moieties can be covalently bonded to the carbon nanotubes and covalently bonded to the nanoparticles.

In general, any type of nanoparticles that can be made to be reactive with the linker moieties can be used in conjunction with the present compositions. The nanoparticles can be organic or inorganic in nature. Illustrative types of nanoparticles that can be used in conjunction with the present compositions include, without limitation, metal nanoparticles, metal oxide nanoparticles, inorganic nanoparticles, non-metal nanoparticles, quantum dots (e.g., semiconductor nanoparticles), polymer nanoparticles, the like, and any combination thereof. More specific examples of nanoparticles that can be used in conjunction with various embodiments of the present compositions can include, for example, indium tin oxide, antimony tin oxide, lanthanum hexaboride, silicon carbide, boron nitride, silicon dioxide, and any combination thereof.

In some embodiments, the nanoparticles can be functionalized to make them reactive with the linker moieties. In some embodiments, the nanoparticles can include a hydroxyl-functionalized surface. In some embodiments, the nanoparticles can include an amine-functionalized surface. In some embodiments, the nanoparticles can include a carboxylate-functionalized surface. In some embodiments, the nanoparticles can include a thiol-functionalized surface. Other types of reactive functionalities can be envisioned by one having ordinary skill in the art, and the foregoing types of reactive functionalities should not be considered limiting. In some embodiments, the nanoparticles can contain the reactive functionalities in their "as-synthesized" state. That is, in some embodiments, the nanoparticles can natively contain the reactive functionalities. In other embodiments, the reactive functionalities can be introduced to the nanoparticles in a separate reaction conducted after their initial synthesis.

In some embodiments, the nanoparticles can undergo a surface reaction to introduce the reactive functionalities. In other embodiments, the nanoparticles can have a molecular coating thereon that contains the reactive functionality. In some embodiments, the nanoparticles can include a surfactant coating thereon. As one of ordinary skill in the art will recognize, inclusion of a surfactant coating can inhibit agglomeration of the nanoparticles, control the size distribution of nanoparticles obtained during their synthesis, make the nanoparticles more dispersible or soluble in a fluid phase, or any combination thereof. In more particular embodiments, the surfactant coating on the nanoparticles can contain the reactive functionalities that allow covalent bonding to the linker moieties to take place. That is, in some embodiments, the surfactant coating can be reactive with a functionality included in the linker moieties.

As one of ordinary skill in the art will recognize, the type of nanoparticles contained within the present compositions can determine the wavelength(s) of electromagnetic radiation that are absorbed by the compositions. For example, metal nanoparticles can be used to achieve absorption in the near-infrared (e.g., 700 nm-1000 nm) and visible (e.g., 400 nm-700 nm) regions of the electromagnetic spectrum based upon localized surface plasmon resonance (LSPR). Conductive oxide nanoparticles can absorb in the shortwave infrared (e.g., 1-3 µm) region of the electromagnetic spectrum, also based upon LSPR. Inorganic nanoparticles can absorb in the mid- (e.g., 3-7 µm) to far-infrared (e.g., above 7 µm) regions of the electromagnetic spectrum based upon Reststrahlen absorption. Within these wavelength ranges and others, particular wavelengths will be absorbed more strongly than others, depending on the actual type and size of the nanoparticles. Thus, by varying the type and size of the nanoparticles, compositions having designed absorption wavelength(s) can be produced. It is also be recognized that other types or sizes of nanoparticles not listed can absorb in other wavelength regions of the electromagnetic spectrum and are considered to lie within the scope of the present disclosure.

In some embodiments, the compositions can contain one type or size of nanoparticle. In some embodiments, the compositions can contain two or more different types or sizes of nanoparticles. Combination of two or more different types or sizes of nanoparticles can allow a greater range of wavelengths of electromagnetic radiation to be absorbed by the compositions. In some embodiments, the compositions can contain two types or sizes of nanoparticles, or three types or sizes of nanoparticles, or four types or sizes of nanoparticles, or five types or sizes of nanoparticles, or six types or sizes of nanoparticles, or seven types or sizes of nanoparticles, or eight types or sizes of nanoparticles, or nine types or sizes of nanoparticles, or ten types or sizes of nanoparticles. In some embodiments, ten or more types or sizes of nanoparticles can be present in the compositions. In embodiments having two or more types or sizes of nanoparticles, each type or size of nanoparticle can interact with electromagnetic radiation of different wavelengths in some embodiments. That is, in some embodiments, each type or size of nanoparticle can absorb different wavelengths of electromagnetic radiation. In some embodiments, the present compositions can contain two or more different sizes of nanoparticles that otherwise have substantially the same chemical composition, where each size of nanoparticle absorbs different wavelengths of electromagnetic radiation.

In some embodiments, the linker moieties can be non-covalently bonded to the carbon nanotubes. In some embodiments, the non-covalent bonding between the carbon nanotubes and the linker moieties can include at least one mode of non-covalent interaction in addition to native van der Waals interaction that occurs between the carbon nanotubes and the linker moieties. Illustrative modes of non-covalent bonding that can take place between the carbon nanotubes and the linker moieties include, for example, ionic bonding, hydrogen bonding, π-π bonding, any combination thereof, and the like.

In some embodiments, the linker moieties can be bonded to the carbon nanotubes by π-π bonding. As one of ordinary skill in the art will recognize, π-π bonding can occur when the delocalized π electron clouds of extended aromatic ring systems interact interfacially with one another. One of ordinary skill in the art will further recognize a carbon nanotube to represent an extended aromatic ring system that is capable of undergoing π-π bonding. In some embodiments, linker moieties that contain at least two fused aromatic rings can form a π-π bond to the carbon nanotubes. In some embodiments, linker moieties that contain at least three fused aromatic rings can form a π-π bond to the carbon nanotubes. In some embodiments, linker moieties that contain at least four fused aromatic rings can form a π-π bond to the carbon nanotubes. In some embodiments, linker moieties that contain at least five fused aromatic rings can form a π-π bond to the carbon nanotubes. Illustrative functionalities having between two and five fused aromatic rings that can form a π-π bond to carbon nanotubes can include, for example, naphthalene, anthracene, phenanthrene, pyrene, benz(a)anthracene, tetracene, benzo[a]pyrene, benzo[e]pyrene, benzo(g,h,i)perylene, chrysene, dibenz(a,h)anthracene, and any derivative thereof. In general, the linker moiety can be attached to the fused aromatic rings at any point.

In some embodiments, at least a portion of the linker moieties can contain a pyrene functionality that forms a π-π bond to the carbon nanotubes. In some embodiments, the linker moiety can have a structure of

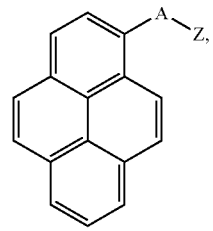

(1)

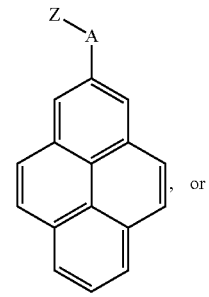

, or (2)

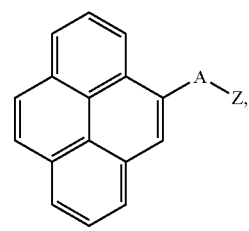

(3)

where A is an organic spacer and Z is a functionality that is reactive with a nanoparticle or a coating surrounding a nanoparticle, and any of the C—H bonds within the pyrene ring system can optionally contain further substitution. In some embodiments, the Z functionality can be operable to form a covalent bond with a nanoparticle or a coating surrounding a nanoparticle. Illustrative Z functionalities that can form a covalent bond include, for example, silanes, alcohols, thiols, carboxylic acids, amines, epoxides, isocyanates, isothiocyanates, and the like.

In some embodiments, the linker moieties can be covalently bonded to the nanoparticles. In general, any mode of covalent bonding between the linker moieties and the nanoparticles is contemplated by the present disclosure. However, as will be recognized by one having ordinary skill in the art, some types of covalent bonds can be more readily formed than others. In the present compositions, it can be advantageous to rapidly form a covalent bond under mild conditions in order to ensure that a sufficient connection of the nanoparticles to the carbon nanotubes occurs within a reasonable length of time. As discussed further below, rapid and high yield connection of the nanoparticles to the carbon nanotubes can be of further benefit when the present compositions are used to form a coated surface.

As noted above, in some embodiments, the nanoparticles can include a hydroxyl-functionalized surface. One mode of covalent attachment chemistry that can be particularly useful for forming a covalent bond with a hydroxyl-functionalized surface involves a reaction with a silane functionality. In some embodiments, at least a portion of the linker moieties can contain a silane functionality that forms a covalent bond to the nanoparticles. Illustrative silane functionalities that can form a covalent bond with a hydroxyl-functionalized nanoparticle surface can include, for example, alkoxysilanes, dialkoxysilanes, trialkoxysilanes, alkyldialkoxysilanes, dialkylalkoxysilanes, silanols, disilanols, trisilanols, and any combination thereof.

In some embodiments, at least a portion of the linker moieties can be non-covalently bonded to the carbon nanotubes and covalently bonded to the nanoparticles. In some embodiments, at least a portion of the linker moieties can be non-covalently bonded to the carbon nanotubes by a π-π bond and covalently bonded to the nanoparticles by a silane functionality. Scheme 1 shows one synthetic route that can be used to produce an illustrative linker moiety containing a pyrene functionality for forming a non-covalent bond to a carbon nanotube and a silane functionality for forming a covalent bond to a nanoparticle having a hydroxyl-functionalized surface. Scheme 2 shows the connection of the linker moiety produced in Scheme 1 to a nanoparticle having a hydroxyl-functionalized surface. In Scheme 2, only one linker moiety has been shown to be connected to nanoparticle. However, Scheme 2 has been depicted in this manner for purposes of clarity only, and it is to be recognized that any number of linker moieties can be connected to a single nanoparticle.

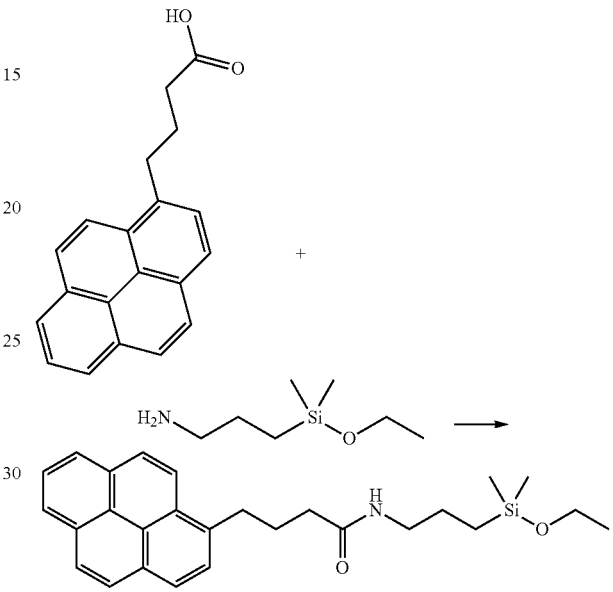

Scheme 1

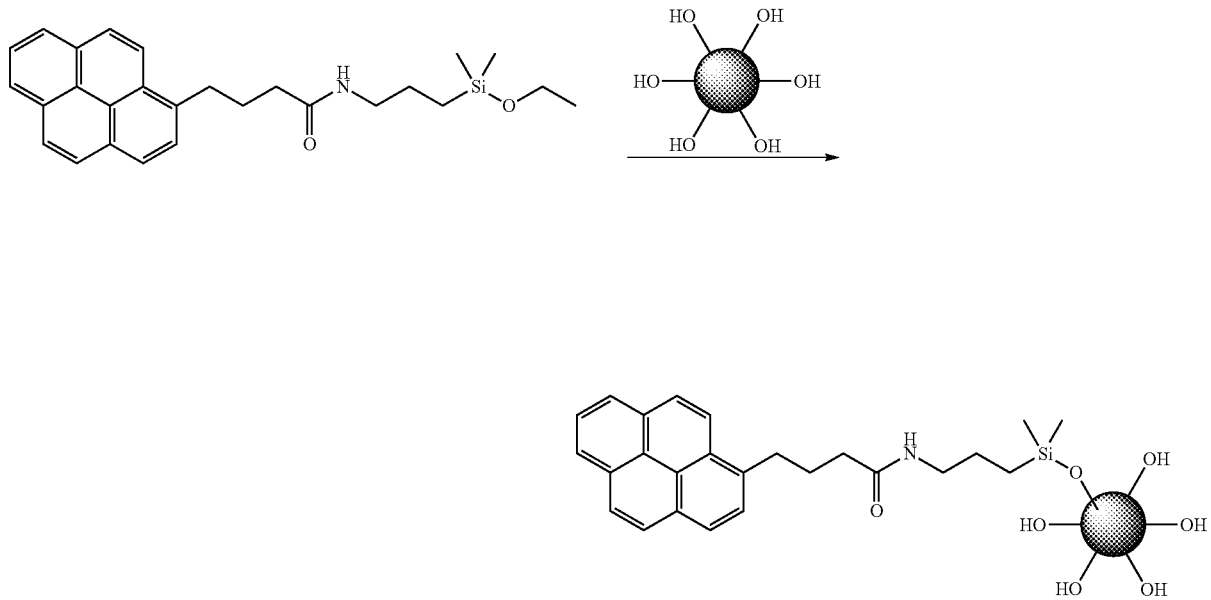

Scheme 2

Again, it is to be recognized that the linker moiety depicted in Schemes 1 and 2 is illustrative in nature only, and any suitable grouping of atoms can be used to form the linkage between the pyrene functionality and the silane functionality. For example, a shorter or longer chain length could be used, or a different coupling strategy could be employed that does not form an amide to connect the chain. Further, as noted above, the pyrene functionality can optionally be substituted, and other types of silane functionalities that are suitable for forming a covalent bond can be used. Any of these variations lie within the capabilities of one having ordinary skill in the art.

In some embodiments, the linker moiety can undergo a direct reaction with the nanoparticle to form a covalent bond thereto. For example, when the linker moiety contains a thiol, the thiol can directly react with a metal nanoparticle to form a covalent bond. Other types of direct covalent attachment can be envisioned by one having ordinary skill in the art.

In some embodiments, rather than being covalently bonded to the nanoparticle, the linker moiety can be covalently bonded to a molecular coating surrounding the nanoparticle in order to achieve a like result. In some embodiments, at least a portion of the linker moieties can be covalently bonded to a surfactant coating on the nanoparticles. In some embodiments, at least a portion of the linker moieties can be non-covalently bonded to the carbon nanotubes (e.g., by a π-π bond) and covalently bonded to a surfactant coating on the nanoparticles. Any mode of covalent bonding between the surfactant coating and the linker moiety is contemplated by the present disclosure. Formation of a covalent bond to the surfactant coating can be particularly facile when the surfactant coating includes an anionic surfactant. For example, an anionic surfactant containing a carboxylic acid, a phosphoric acid, or a sulfonic acid can be esterified with a hydroxyl group in the linker moiety to form a covalent bond. Scheme 3 shows the coupling of a surfactant-coated nanoparticle with an illustrative linker moiety containing a hydroxyl group.

Scheme 3

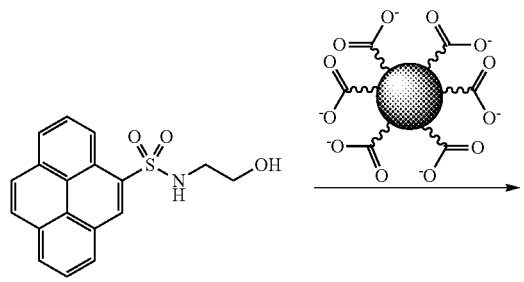

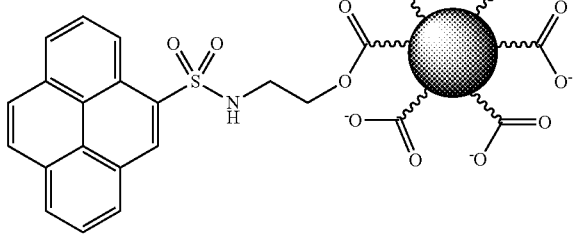

Again, it is to be recognized that the linker moiety depicted in Scheme 3 has been presented for purposes of illustration and not limitation, and other linker moieties and types of covalent attachments to a surfactant-coated nanoparticle can be envisioned by one having ordinary skill in the art. Further, although only one linker moiety has been shown to be connected to the surfactant coating, it is to be recognized that Scheme 3 has been depicted in this manner for purposes of clarity only, and any number of linker moieties can be connected to a single nanoparticle via its surfactant coating.

The amounts of the carbon nanotubes, the nanoparticles, and the linker moieties can vary over a broad range in the present compositions. In some embodiments, an amount of carbon nanotubes in the compositions can range between about 10% and about 90% by weight, or between about 20% and about 80% by weight, or between about 25% and about 75% by weight. In some embodiments, an amount of nanoparticles in the compositions can range between about 10% and about 90% by weight, or between about 20% and about 80% by weight, or between about 30% and about 70% by weight. In some embodiments, an amount of linker moieties in the compositions can range between about 10% and about 90% by weight, or between about 20% and about 80% by weight, or between about 30% and about 70% by weight. As one of ordinary skill in the art will recognize, when the ratio of linker moieties to nanoparticles is high, attachment of greater numbers of linker moieties to the nanoparticles will generally be favored. The attachment of multiple linker moieties to the nanoparticle, in turn, can favor connection of a single nanoparticle to multiple carbon nanotubes. Likewise, when the ratio of nanoparticles to carbon nanotubes is high, connection of greater numbers of nanoparticles to each carbon nanotube will generally be favored on average.

In some embodiments, compositions described herein can include a plurality of carbon nanotubes, a plurality of nanoparticles, and a plurality of linker moieties, where at least a portion of the linker moieties connect at least a portion of the carbon nanotubes to the nanoparticles, and where at least a portion of the linker moieties are covalently bonded to the nanoparticles by a silane functionality and non-covalently bonded to the carbon nanotubes.

In some embodiments, compositions described herein can include a plurality of carbon nanotubes, a plurality of nanoparticles, a plurality of linker moieties, and a surfactant coating on the nanoparticles that is reactive with a functionality included in the linker moieties, where at least a portion of the linker moieties connect at least a portion of the carbon nanotubes to the nanoparticles, and where at least a portion of the linker moieties are covalently bonded to the surfactant coating on the nanoparticles and non-covalently bonded to the carbon nanotubes.

In some embodiments, coated surfaces are described herein. In some embodiments, the coated surface can include a substrate and a coating on the substrate, the coating including a composition that contains a plurality of carbon nanotubes, a plurality of nanoparticles, and a plurality of linker moieties, where at least a portion of the linker moieties connect at least a portion of the carbon nanotubes to the nanoparticles. Any of the compositions heretofore described can be used for coating a substrate. In various embodiments, a type and/or size of the nanoparticles can determine a wavelength of electromagnetic radiation absorbed by the coated surface. That is, the type and/or size of the nanoparticles can determine the wavelengths of electromagnetic radiation that are transmitted or reflected by the coated surface. Accordingly, the present compositions can be used to convey electromagnetic radiation filtering capabilities to a surface. As also described above, in various embodiments, the compositions can include two or more different types and/or sizes of nanoparticles, thereby allowing further tuning of the wavelengths of electromagnetic radiation absorbed by the coatings to take place.

In some embodiments, the coatings can include a substrate and a coating on the substrate, the coating including a composition that contains a plurality of carbon nanotubes; a plurality of nanoparticles containing two or more different types or sizes of nanoparticles, each type or size of nanoparticle interacting with electromagnetic radiation of different wavelengths; and a plurality of linker moieties, where at least a portion of the linker moieties connect at least a portion of the carbon nanotubes to the nanoparticles.

In some embodiments, the coatings can include a substrate and a coating on the substrate, the coating including a composition that contains a plurality of carbon nanotubes; a plurality of nanoparticles; and a plurality of linker moieties, where at least a portion of the linker moieties connect at least a portion of the carbon nanotubes to the nanoparticles, and where at least a portion of the linker moieties are covalently bonded to the nanoparticles by a silane functionality and non-covalently bonded to the carbon nanotubes.

In some embodiments, the coatings can include a substrate and a coating on the substrate, the coating including a composition that contains a plurality of carbon nanotubes; a plurality of nanoparticles; a plurality of linker moieties; and a surfactant coating on the nanoparticles that is reactive with a functionality included in the linker moieties, where at least a portion of the linker moieties connect at least a portion of the carbon nanotubes to the nanoparticles, and where at least a portion of the linker moieties are covalently bonded to the surfactant coating on the nanoparticles and non-covalently bonded to the carbon nanotubes.

When the present compositions are used as a coating, the type of substrate upon which the compositions are applied is not particularly limited. In some embodiments, substrate can be a metal substrate. In some embodiments, the substrate can be a polymer substrate. In some embodiments, the substrate can be a glass substrate. In some embodiments, the substrate can be substantially transparent, and in other embodiments, the substrate can be substantially opaque. In various embodiments, the coating being applied can absorb at least one wavelength of electromagnetic radiation that is not absorbed by the uncoated substrate material. Further, as described below, the substrate can be further functionalized, in some embodiments.

The mode of surface interaction between the carbon nanotubes and the substrate is not considered to be particularly limited. In some embodiments, the carbon nanotubes can be unfunctionalized. In such embodiments, the carbon nanotubes can be associated with the substrate primarily through van der Waals interactions. In other embodiments, the carbon nanotubes can be functionalized. In such embodiments, the carbon nanotubes can be associated with the substrate through a combination of van der Waals interactions and at least one other type of chemical interaction. For example, in some embodiments, the carbon nanotubes can be ionically associated with the substrate, hydrogen bonded to the substrate, covalently bonded to the substrate, or any combination thereof. In some embodiments, the substrate itself can be functionalized to increase its interaction with the carbon nanotubes. For example, in some embodiments, the substrate can be functionalized to introduce a functionality thereon that is reactive with a functionality in functionalized carbon nanotubes. In other embodiments, the substrate can be functionalized to introduce a functionality thereon that increases an amount of π-π bonding between the substrate and the carbon nanotubes.

When used as a coating, the coating thickness can vary over a wide range. In various embodiments, the thickness of the coating can be about 5 nm or greater. In some embodiments, a thickness of the coating can range between about 5 nm and about 100 µm, or between about 5 nm and about 50 µm, or between about 5 nm and about 1 µm.

In some embodiments, the coatings can include a monolayer of carbon nanotubes on the substrate. In other embodiments, thicker coatings of carbon nanotubes can be used. In some embodiments, the coatings can include multiple carbon nanotube layers, where nanoparticles and linker moieties bridge between alternating carbon nanotube layers. For example, in some embodiments, a first layer of carbon nanotubes can be non-covalently bonded to the substrate surface and have nanoparticles connected thereto by the linker moieties. Any linker moieties on the nanoparticles that are not geometrically positioned to connect to the first carbon nanotube layer can then bridge to other carbon nanotubes, which can comprise an additional carbon nanotube layer. In some embodiments, the coatings can be deposited in a layer-by-layer manner with alternating depositions of carbon nanotubes and linker moiety-bound nanoparticles taking place. In other embodiments, coatings containing the present compositions can include homogenous dispersions of carbon nanotube networks, where linker moiety-bound nanoparticles bridge between the various carbon nanotubes without there being a defined layer structure present.

As noted above, methods for forming the present compositions and applying the compositions to a substrate can be rapidly carried out under mild synthesis conditions, in some embodiments. The ease with which the syntheses can be conducted can allow thermally sensitive substrates and/or linker moieties to be used in some of the present embodiments. When the linker moieties contain a functionality that can form a π-π bond with a carbon nanotube, the compositions can essentially "self-assemble" in situ, with the nanoparticles being covalently bonded to the linker moieties either before or after the linker moieties are connected to the carbon nanotube. Thus, there is considerable synthetic flexibility that can be exercised in preparing the compositions.

In some embodiments, the compositions can be prepared by mixing a plurality of carbon nanotubes, a plurality of linker moieties, and a plurality of nanoparticles in a fluid phase; forming non-covalent covalent bonds between the linker moieties and the carbon nanotubes; and forming covalent bonds between the linker moieties and the nanoparticles or a coating therein. That is, in some embodiments, preparation of the compositions can take place in a "one-pot" synthesis. Formation of the compositions in a "one-pot" synthesis can be particularly advantageous, in some embodiments, due to its synthetic ease. In some embodiments, the non-covalent bonds between the linker moieties and the carbon nanotubes can be formed first, with the covalent bonds to the nanoparticles or a coating thereon being formed thereafter. In some embodiments, the covalent bonds between the linker moieties and the nanoparticles can be formed first, with the non-covalent bonds to the carbon nanotubes being formed thereafter. In some embodiments, formation of the non-covalent bonds and the covalent bonds can take place concurrently in the reaction mixture.

In some embodiments, the compositions can be prepared by mixing a plurality of carbon nanotubes with a plurality of linker moieties; forming non-covalent bonds between the carbon nanotubes and the linker moieties; and thereafter, forming covalent bonds between the linker moieties and the nanoparticles or a coating thereon. That is, in such embodiments, the compositions can be formed in a two-step process, with the non-covalent bonds between the carbon nanotubes and the linker moieties being formed first. In some embodiments, if desired, the linker moiety-bound carbon nanotubes can be isolated and purified before bonding the nanoparticles. In other embodiments, the linker moiety-bound carbon nanotubes can be used directly without additional purification or isolation.

In some embodiments, the compositions can be prepared by mixing a plurality of linker moieties with a plurality of nanoparticles; forming covalent bonds between the linker moieties and the nanoparticles or a coating thereon; and thereafter, forming non-covalent bonds between the carbon nanotubes and the linker moieties. That is, in such embodiments, the compositions can be formed in a two-step process, with the covalent bonds between the nanoparticles and the linker moieties being formed first. In some embodiments, if desired, the linker moiety-bound nanoparticles can be isolated and purified before bonding the carbon nanotubes. In other embodiments, the linker moiety-bound nanoparticles can be used directly without additional purification or isolation.

Likewise, there is considerable operational flexibility that can be exercised when applying the compositions to a substrate. In some embodiments, the pre-formed compositions can be applied to a substrate directly (e.g., from a fluid phase). In other embodiments, the compositions can be formed in stages on the substrate.

In some embodiments, methods for applying the compositions to a substrate can include providing a plurality of linker moieties, at least a portion of the linker moieties containing a silane functionality and at least one other functional group; providing a plurality of nanoparticles and a plurality of carbon nanotubes; forming a covalent bond between a linker moiety and a nanoparticle by reacting the silane functionality; forming a non-covalent bond between a linker moiety and a carbon nanotube; and applying the plurality of carbon nanotubes to a substrate.

In some embodiments, the non-covalent bond to the carbon nanotube can be formed after applying the plurality of carbon nanotubes to the substrate. That is, in such embodiments, the plurality of carbon nanotubes can first be applied to a substrate, with the connections to the nanoparticles via the linker moieties being formed thereafter. In some embodiments, a linker moiety can be bonded to a carbon nanotube on a substrate, with a nanoparticle being bonded to the linker moiety thereafter. In other embodiments, a nanoparticle can first be bonded to a linker moiety, with the linker moiety-bound nanoparticle being bonded to a carbon nanotube thereafter.

Application of carbon nanotubes to the substrate can take place using any technique known to one having ordinary skill in the art. In some embodiments, the carbon nanotubes can be applied to the substrate by techniques such as, for example, spray coating, dip coating, spin coating, drop coating, brush coating, the like, and any combination thereof. If the carbon nanotubes are first applied to a substrate prior to forming a connection thereto, carbon nanotubes can be directly grown on the substrate, in some embodiments, using techniques that will be familiar to one having ordinary skill in the art. It is to be noted that the foregoing techniques, other than direct carbon nanotube deposition, can also be used to apply other components of the present compositions and/or combinations of carbon nanotubes and other components of the present compositions to a substrate.

In some embodiments, the covalent bond to the nanoparticle can be formed before forming the non-covalent bond to the carbon nanotube. That is, in such embodiments, a linker moiety-bound nanoparticle can be formed before forming the connection to the carbon nanotube. In some embodiments, a linker moiety-bound nanoparticle can be formed and then non-covalently bonded to a carbon nanotube on a substrate in order to form the present compositions. That is, in some embodiments, the compositions can be directly formed on a substrate. In other embodiments, a linker moiety-bound nanoparticle can formed and then non-covalently bonded a carbon nanotube to form the present compositions before the carbon nanotube is applied to a substrate. In some embodiments, the compositions can be formed in a fluid phase, which can be an aqueous fluid phase in some embodiments. In some embodiments, a semiconductor-grade aqueous dispersion of carbon nanotubes that is free of surfactants can be used as a fluid phase for forming the present compositions. In some embodiments, compositions formed in a fluid phase can be applied to a substrate thereafter.

As described above, there can be considerable synthetic flexibility in how the present compositions are formed and applied to a substrate. In some embodiments, both the non-covalent bond to the carbon nanotube and the covalent bond to the nanoparticle can each be formed before applying the plurality of carbon nanotubes to a substrate. In some embodiments, forming the non-covalent bond to the carbon nanotube and the covalent bond to the nanoparticle can include mixing the plurality of carbon nanotubes, the plurality of linker moieties, and the plurality of nanoparticles with one another, and allowing the composition to form. In some embodiments, mixing the plurality of carbon nanotubes, the plurality of linker moieties, and the plurality of nanoparticles with one another can take place in a fluid phase (e.g., an aqueous fluid phase). Thereafter, the compositions can be applied to a substrate using any of the deposition techniques set forth above.

In some embodiments, methods for applying the compositions to a substrate can include providing a plurality of carbon nanotubes and a plurality of nanoparticles, the nanoparticles having a surfactant coating thereon; providing a plurality of linker moieties, at least a portion of the linker moieties having at least two functional groups, a first functional group being reactive with the surfactant coating; forming a covalent bond between a linker moiety and the surfactant coating of a nanoparticle by reacting the first functional group; forming a non-covalent bond between a linker moiety and a carbon nanotube; and applying the plurality of carbon nanotubes to a substrate.

As set forth in regard to the previously described embodiments in which a silane functionality was used to form a covalent bond to a nanoparticle, there remains considerable synthetic flexibility that can be exercised in how the compositions with nanoparticles having a surfactant coating are formed and applied to a substrate. Unless indicated otherwise, any synthetic operation that was described above for a linker moiety having a silane functionality can be practiced in a like manner when the linker moiety is being covalently bonded to a surfactant coating on the nanoparticles.

In some embodiments, the non-covalent bond to the carbon nanotube can be formed after applying the plurality of carbon nanotubes to a substrate. In other embodiments, the non-covalent bond to the carbon nanotube can be formed before applying the plurality of carbon nanotubes to a substrate. In some embodiments, the covalent bond to the surfactant coating can be formed before forming the non-covalent bond to the carbon nanotube. For example, in some embodiments, the covalent bond to the surfactant coating can first be formed, with a non-covalent bond to the linker moiety-bound nanoparticle being formed thereafter. In other embodiments, the covalent bond to the surfactant coating can be formed after forming a non-covalent bond between the linker moiety and the carbon nanotube. In some embodiments, the non-covalent bond to the carbon nanotube and the covalent bond to the surfactant coating can each be formed before applying the plurality of carbon nanotubes to a substrate.

In some embodiments, the methods for applying the compositions to a substrate can further include selecting the plurality of nanoparticles in order to convey a desired property to the substrate. As described above, selecting the plurality of nanoparticles can involve choosing the type and/or size of nanoparticles in order to convey a desired property to the substrate. For example, in some embodiments, the nanoparticles can be chosen such that the substrate absorbs certain wavelengths of electromagnetic radiation. In some embodiments, selecting the plurality of nanoparticles can involve choosing two or more types and/or sizes of nanoparticles in order to convey a desired property to the substrate. In some embodiments, each type or size of nanoparticle can interact with electromagnetic radiation of a different wavelength. For example, in some applications, it can be desirable to have two or more distinct wavelengths or wavelength ranges absorbed by the coating on a substrate. If a single type and/or size of nanoparticle cannot be identified that absorbs at both wavelengths or wavelength ranges, a combination of nanoparticles can be used to provide the desired absorption properties.

It is understood that modifications which do not substantially affect the activity of the various embodiments of this invention are also included within the definition of the invention provided herein. Although the invention has been described with reference to the disclosed embodiments, one having ordinary skill in the art will readily appreciate that these embodiments are only illustrative of the invention. It should be understood that various modifications can be made without departing from the spirit of the invention. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is the following:

1. A method comprising:
   providing a plurality of linker moieties, at least a portion of the linker moieties comprising a silane functionality and a functionality comprising at least two fused aromatic rings;
   providing a plurality of nanoparticles and a plurality of carbon nanotubes;
   forming a covalent bond between at least one linker moiety and a nanoparticle by reacting the silane functionality with the nanoparticle, and forming a non-covalent bond between the at least one linker moiety and a carbon nanotube, the at least one linker moiety extending between the nanoparticle and the carbon nanotube;

wherein the at least one linker moiety is non-covalently bonded to the carbon nanotube by π-π bonding of the functionality comprising the at least two fused aromatic rings; and applying the plurality of carbon nanotubes to a substrate, the non-covalent bond between the at least one linker moiety and the carbon nanotube being formed before or after application of the plurality of carbon nanotubes to the substrate.

2. The method of claim 1, wherein the non-covalent bond to the carbon nanotube is formed after applying the plurality of carbon nanotubes to the substrate.

3. The method of claim 1, wherein the non-covalent bond to the carbon nanotube and the covalent bond to the nanoparticle are each formed before applying the plurality of carbon nanotubes to the substrate.

4. The method of claim 1, further comprising:
selecting the plurality of nanoparticles to convey a desired property to the substrate.

5. The method of claim 4, wherein the plurality of nanoparticles comprises two or more different types or sizes of nanoparticles, each type or size of nanoparticle absorbing different wavelengths of electromagnetic radiation.

6. The method of claim 1, wherein the plurality of nanoparticles comprise a substance selected from the group consisting of indium tin oxide, antimony tin oxide, lanthanum hexaboride, silicon carbide, boron nitride, silicon dioxide, and any combination thereof.

7. The method of claim 1, wherein the at least one linker moiety comprises a pyrene functionality that forms a π-π bond to the carbon nanotube.

8. The method of claim 1, wherein the nanoparticles comprise a surfactant coating.

9. The method of claim 8, wherein the surfactant coating is reactive with the at least one linker moiety to form the covalent bond to the nanoparticle.

10. A method comprising:
providing plurality of carbon nanotubes and a plurality of nanoparticles, the nanoparticles having a surfactant coating thereon;
providing a plurality of linker moieties, at least a portion of the linker moieties comprising at least two functional groups, a first functional group being reactive with the surfactant coating;
forming a covalent bond between at least one linker moiety and the surfactant coating of a nanoparticle by reacting the first functional group with the surfactant coating, and forming a non-covalent bond between a second functional group of the at least one linker moiety and a carbon nanotube, the at least one linker moiety extending between the nanoparticle and the carbon nanotube; and applying the plurality of carbon nanotubes to a substrate, the non-covalent bond between the second functional group of the at least one linker moiety and the carbon nanotube being formed before or after application of the plurality of carbon nanotubes to the substrate.

11. The method of claim 10, wherein the non-covalent bond to the carbon nanotube is formed after applying the plurality of carbon nanotubes to the substrate.

12. The method of claim 10, wherein the non-covalent bond to the carbon nanotube and the covalent bond to the surfactant coating are each formed before applying the plurality of carbon nanotubes to the substrate.

13. The method of claim 10, further comprising:
selecting the plurality of nanoparticles to convey a desired property to the substrate.

14. The method of claim 13, wherein the plurality of nanoparticles comprises two or more different types or sizes of nanoparticles, each type or size of nanoparticle absorbing different wavelengths of electromagnetic radiation.

15. The method of claim 10, wherein the first functional group comprises a silane functionality that is reactive with the surfactant coating.

16. The method of claim 10, wherein the nanoparticles comprise a substance selected from the group consisting of indium tin oxide, antimony tin oxide, lanthanum hexaboride, silicon carbide, boron nitride, silicon dioxide, and any combination thereof.

17. The method of claim 10, wherein the at least one linker moiety is non-covalently bonded to the carbon nanotube by π-π bonding.

18. The method of claim 17, wherein the second functionality comprises a pyrene functionality that forms a π-π bond to the carbon nanotube.

19. The method of claim 1, wherein the functionality comprising at least two fused aromatic rings is selected from the group consisting of naphthalene, anthracene, phenanthrene, pyrene, benz(a)anthracene, tetracene, benzo[a]pyrene, benzo[e]pyrene, benzo(g,h,i)perylene, chrysene, and dibenz(a,h)anthracene.

20. The method of claim 10, wherein the second functional group comprises at least two fused aromatic rings and is selected from the group consisting of naphthalene, anthracene, phenanthrene, pyrene, benz(a)anthracene, tetracene, benzo[a]pyrene, benzo[e]pyrene, benzo(g,h,i)perylene, chrysene, and dibenz(a,h)anthracene.

* * * * *